United States Patent [19]

Chrisman et al.

[11] Patent Number: 5,613,930
[45] Date of Patent: Mar. 25, 1997

[54] DEVICE FOR EXTRACTING, STORING AND HANDLING DRILL BIT CASSETTES

[75] Inventors: David C. Chrisman, Sandston; Gary J. Emrhein, Midlothian, both of Va.

[73] Assignee: Lucent Technologies, Inc., Murray Hill, N.J.

[21] Appl. No.: 497,120

[22] Filed: Jun. 30, 1995

[51] Int. Cl.$^6$ .................................................. B23Q 3/155
[52] U.S. Cl. ................................ 483/1; 211/1.57; 483/63
[58] Field of Search ............................. 483/1, 52, 63, 483/64; 211/1.57; 221/98

[56] References Cited

U.S. PATENT DOCUMENTS 3,188,736  6/1965  Brainard et al. ................... 483/52 X
4,800,645  1/1989  Limongelli et al. ................ 483/63 X
5,068,958  12/1991  Kosmowski ............................ 483/1
5,478,300  12/1995  McMurtry et al. ................... 483/64

FOREIGN PATENT DOCUMENTS 3331293   3/1984   Germany .............................. 483/64
3644024   6/1988   Germany .............................. 483/63
3715874  10/1988   Germany .............................. 483/64
 217240  12/1983   Japan .................................. 483/63
  34742   2/1987   Japan .................................. 413/52

*Primary Examiner*—William R. Briggs

[57] ABSTRACT

A device for storing and handling at least one drill bit cassette includes a channel member having a height, two ends and a length extending between the two ends. At least one of the two ends is dimensioned to slidingly receive the at least one drill bit cassette. As a result, drill bit cassettes can be safely and efficiently removed, installed and stored.

19 Claims, 4 Drawing Sheets

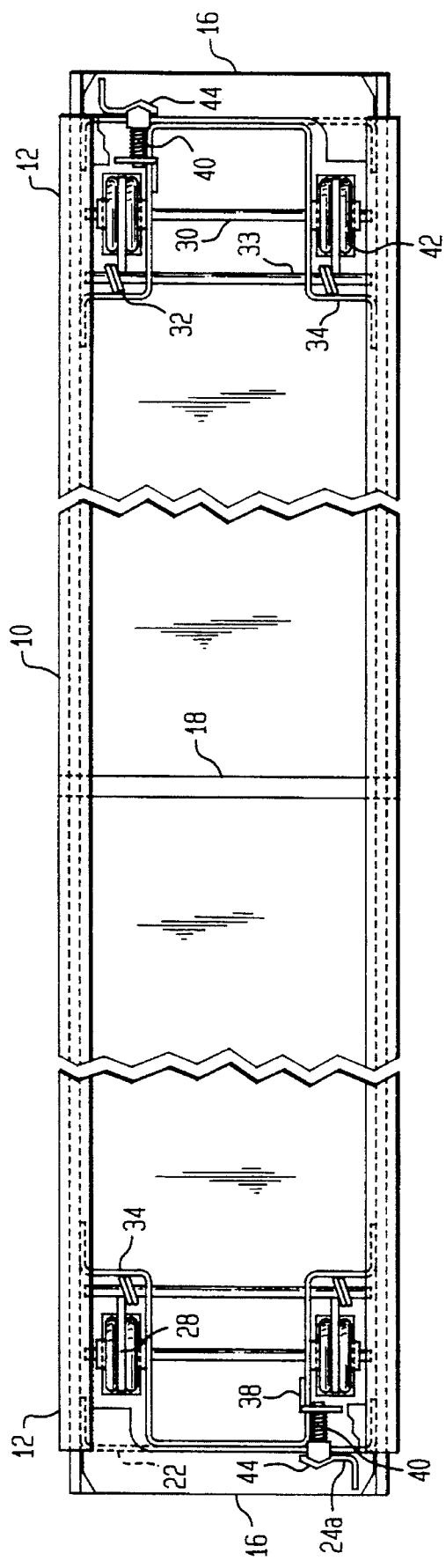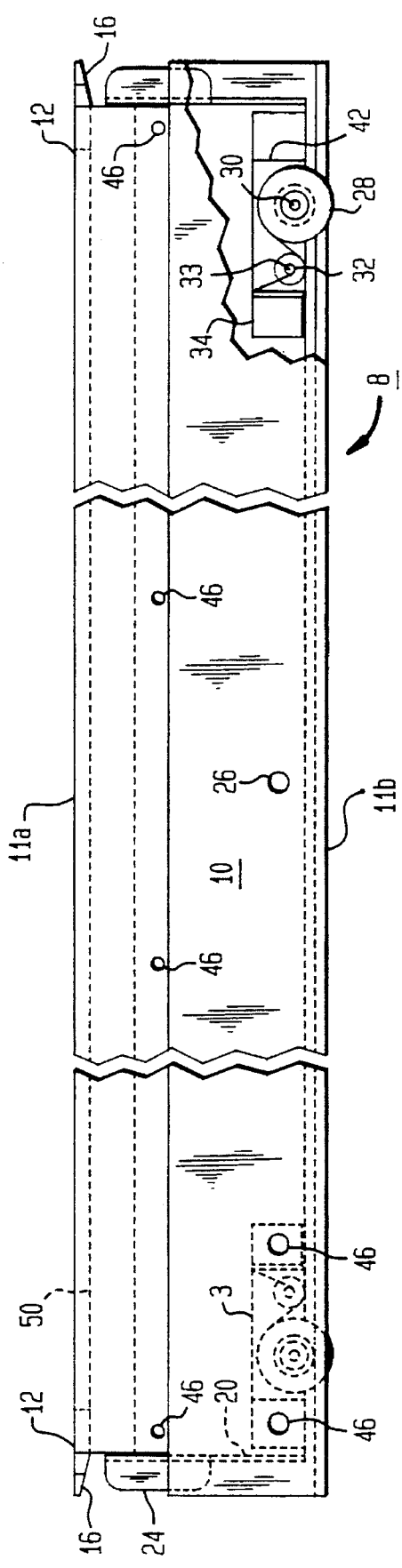

DEVICE FOR EXTRACTING, STORING AND HANDLING DRILL BIT CASSETTES

BACKGROUND OF THE INVENTION

1. Field of the Invention

The present invention relates to handling devices, and in particular, to a device that facilitates installing, removing and transporting drill bit cassettes for an industrial drill press.

2. Description of Related Art

Industrial drill presses having a great number of drill bits for drilling many holes and various size holes are known. In one configuration, any one of several groups of drill bits can be positioned over an automatic tool changer by indexing a head that rotates in a vertical plane. Each group of drill bits projects radially outward from the center of the head. As the head is indexed, the current group rotates upward and away from the tool changer while the next group rotates into position. Some drill presses include multiple heads. Over time, however, the groups of drill bits on each head wear and require servicing or replacement.

Because changing bits individually consumes valuable production time, some drill presses are configured to accept cassettes that allow each group of drill bits for each head to be changed quickly by replacing used cassettes with new ones. The spent drill bits in the used cassettes can then be sharpened while the drill press remains in an operable condition with the new cassettes.

The cassette is designed to be easily inserted into and removed from the drill press head. During installation of a new cassette, an operator places the cassette near an empty position on the head of the drill press and increases the applied force to overcome the friction of a spring-tensioned sliding fit to engage the cassette with the head. Based on the operating conditions in many facilities, however, the drill press heads are difficult for smaller operators to reach. In many cases, the operator is separated from the drill press head by as much as four feet. As a result, changing cassettes requires more time and increases the risk of injury to these operators. Furthermore, providing a device that could store and would eliminate the need to separately handle several spent cassettes at once would be advantageous in saving production time.

SUMMARY OF THE INVENTION

An object of the present invention is to provide a device that allows an operator to reach a drill press head so that cassettes can be changed easily. Another object of the invention is providing a device that allows cassettes to be stored and transported without becoming lost or damaged and prevents the points of the bits from causing injury to personnel.

To achieve these and other objects, the device for storing and handling at least one drill bit cassette includes a channel member having a height, two ends and a length extending between the two ends. At least one of the two ends is dimensioned to slidingly receive the drill bit cassette.

The device can include at least one nose portion that projects from one of the two ends. The nose portion is engageable with a receiving portion of a drill press so that the device can be aligned with the drill press for transferring the drill bit cassette between the drill press and the device. Either end of the device can include a retainer to prevent the drill bit cassette from being removed from the device. The retainer is movable between an open position and a closed position.

The device can include a height compensation member that is attached to the channel member. The height compensation member has an extended position and a retracted position. In the extended position, the height compensation member extends the height of the channel member. In the retracted position, the height compensation member does not project beyond the height of the channel member. The height compensation member can include at least one roller that projects through a slot in the channel member and is normally biased to the extended position by a spring.

The two ends of the channel member can be symmetrical. The channel member can include an upper portion having slots dimensioned to receive the edges of the drill bit cassette. The upper portion is attached to a U-shaped lower portion having a depth greater than a height of a drill bit within the drill bit cassette.

In addition to the channel member described above, the device can include an extending member that extends a reach of an operator. The extending member has a cassette engaging end dimensioned to engage the drill bit cassette and an operating end disposed opposite the cassette engaging end. By actuating the operating end, the operator opens the engaging end to engage the drill bit cassette and permit it to be transferred between the device and the drill press.

The cassette receiving end can include a notched portion. The operating end can include a release connected by a linkage to the cassette receiving end. The linkage can include a spring disposed such that the cassette receiving portion is normally biased to a closed position.

BRIEF DESCRIPTION OF THE DRAWINGS

A complete understanding of the present invention may be obtained by reference to the accompanying drawings, when considered in conjunction with the subsequent detailed description thereof, in which:

FIG. 1 is a plan view of the extracting, storing and handling device of the present invention;

FIG. 2 is an elevation view of the device shown in FIG. 1;

DETAILED DESCRIPTION OF PREFERRED EMBODIMENTS

Figure 3:
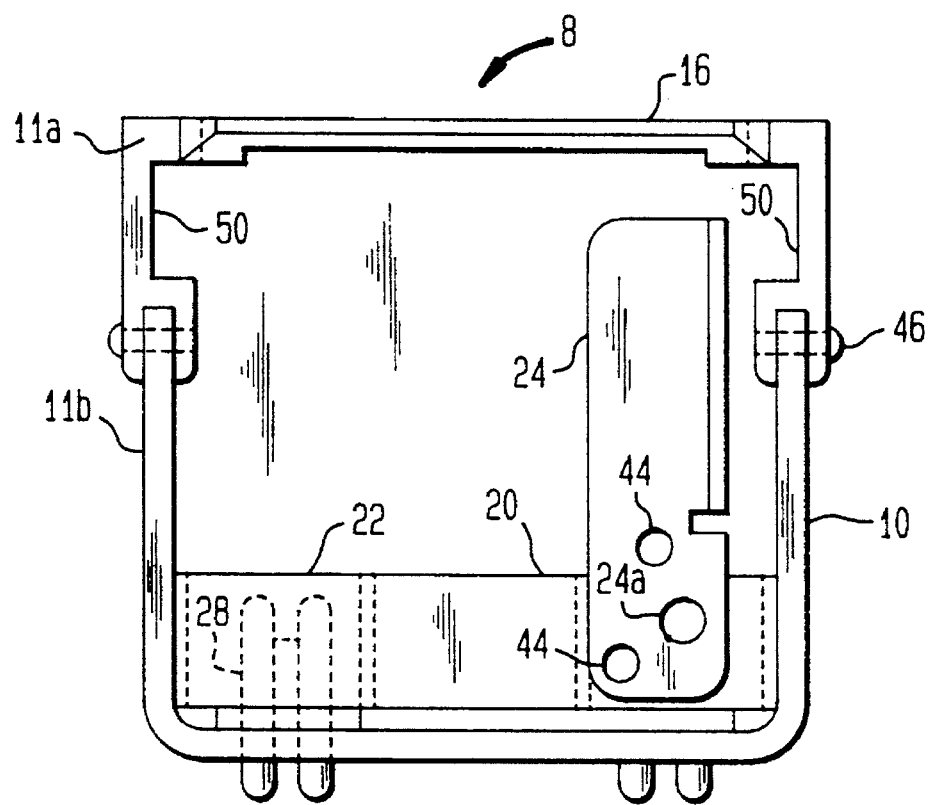
FIG. 3 is an enlarged side elevation view of the device shown in FIGS. 1 and 2.

FIGS. 1, 2 and 3 show plan, elevation and side views, respectively, of a storage and handling device 8 according to the present invention. The device 8 includes a channel member 10 having two ends 12. In a preferred embodiment, the ends are symmetrical so that an operator need not maintain a proper orientation of the device 8.

The channel member 10 includes a lower portion 11b joined to an upper portion 11a by rivets 46. The lower portion 11b has a generally U-shaped cross section dimensioned to mate with the upper portion 11a. The lower portion 11b is preferably constructed of LEXAN to reduce the overall weight of the device 8. A support 18 extends across the lower portion 11b at a point approximately midway along the length of the channel member 10. The support 18 is secured to the channel member 10 by screws 26.

Figure 7:
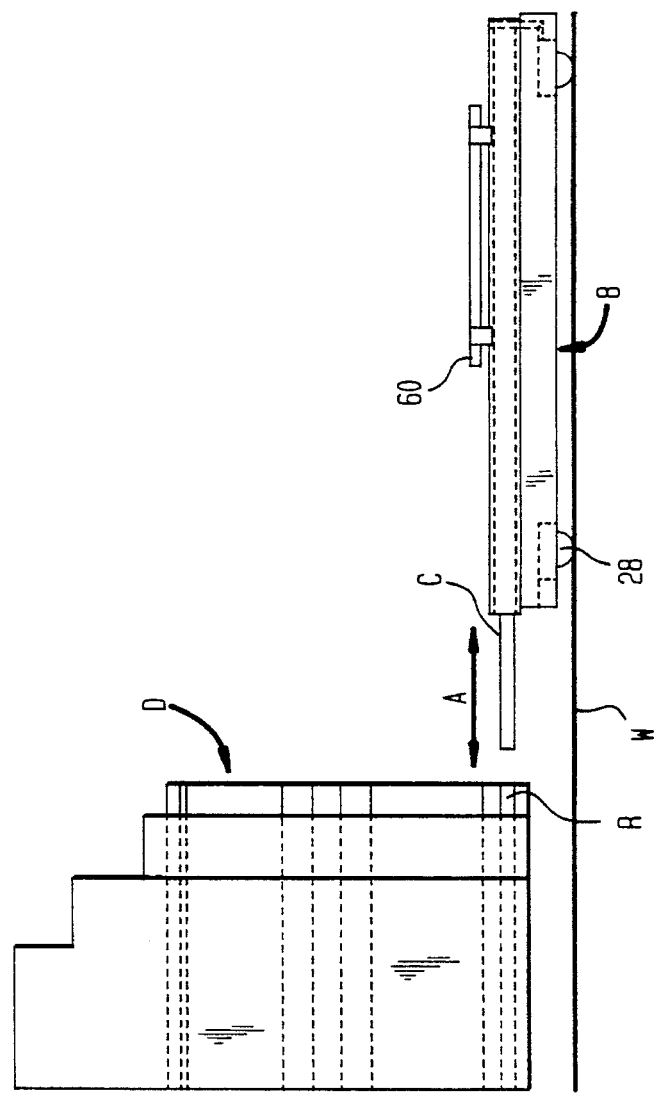
FIG. 7 is a side view of the device and the extractor shown in relation to a head of a drill press and a work surface during operation.

The upper portion 11a of the channel member 10 includes grooves 50 that are dimensioned to slidingly receive a generally rectangular drill bit cassette (see FIG. 7). A span between the grooves 50 is slightly greater than a width of the cassette. When a cassette is inserted into the device 8, the edges of the cassette mate with the grooves 50 and the drill bits project downward toward the bottom of the channel member 10. The upper portion 11a is preferably extruded from aluminum to provide adequate wear resistance and dimensional stability and to avoid excess weight.

Figure 8:
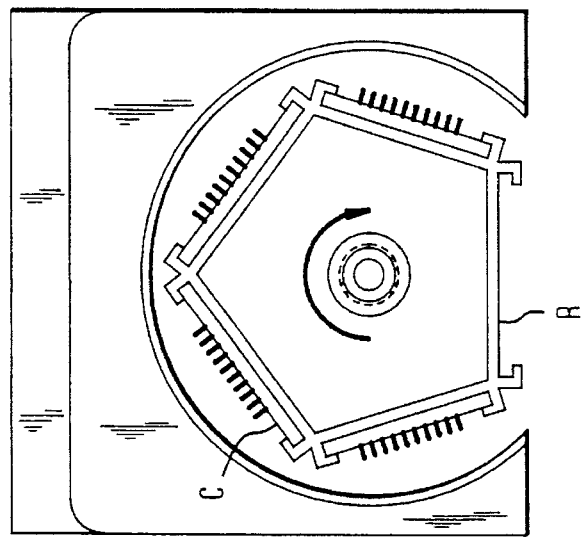
FIG. 8 is a front view of the drill head shown in FIG. 7.

Each side of the upper portion 11a is joined by a nose portion 16 at each end 12. The nose portion 16 is constructed of aluminum and is attached to the upper portion 11a by screws (not shown). The nose portion 16 is tapered and dimensioned to engage a corresponding receptacle R disposed on a head H of a drill press (see FIGS. 7 and 8).

A pair of rollers 28 projects through spaced apertures 42 disposed at both ends 12 in the bottom of the lower portion 11b of the device. Each pair of rollers 28 rotates on an axle 30. Each axle 30 extends through an aperture in a metal frame 34 attached to the lower portion 11b by rivets 46.

The axle 30 for each pair of rollers 28 is normally biased downward by a spring 32 so that the rollers 28 project below a bottom surface of the device 8. The spring 32 is disposed to pivot around a spring support 33 that extends through the lower portion 11b parallel to and at a point spaced apart from the axle 30. By overcoming the force of the spring 32, the rollers can be fully retracted within the channel member 10.

A retainer 20 is disposed at each end of the device 8 within the channel member 10 to prevent the cassettes from sliding out of the device 8. The retainer 20 includes a fixed portion 22 and a pivoting portion 24. The fixed portion 22 extends across the width of and is attached by rivets 46 to the lower portion 11b. The pivoting portion 24 is attached to the fixed portion 22 by and disposed to pivot around a pivot rivet 24a. The pivoting portion 24 is secured in the upright or retaining position as shown by a spring-biased stop 40 that engages a lower one of two dimples 44 on the pivoting portion 24. The spring-biased stop 40 engages the upper one of the two dimples 44 when the pivoting portion is in the down or open position (not shown). The spring-biased stop is attached to the frame by a bracket 38.

in a preferred embodiment, the device 8 accommodates five cassettes and extends an operator's reach by approximately 42 inches. The device 8 weighs approximately 3.33 pounds empty and approximately 8.33 pounds when loaded with five cassettes. As a result, any operator can easily lift and handle the device 8.

In operation, when loading a new cassette from the device 8 into an empty position of a drill press head, an operator first pivots the pivoting portion 24 of the retainer 20 at either end 12 to allow a drill bit cassette to be removed. One of the two ends is selected based on any orientation dictated by the drill bit cassette and the drill press head. As shown in FIG. 7, the operator then places the device 8 on the work surface W and slides the device toward the empty position of the head in the direction of arrow A so that the nose portion 16 engages the receptacle R disposed on the head H. Any difference in the vertical dimension between a height of the receptacle from the work surface and a height of the nose portion from the work surface is compensated by the spring-biased rollers 28. If the device 8 is loaded with several drill bit cassettes C, the operator can push the closest drill bit cassette to slide the others along the channel member 10. In this manner, the movement of the other cassettes in turn moves the farthest drill bit cassette so that it may be inserted into the empty receptacle.

Figure 6:
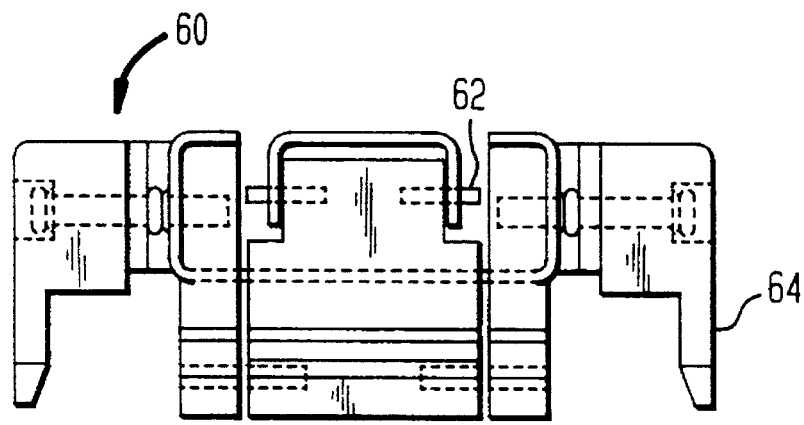
FIG. 6 is an enlarged side elevation view of the extractor show in FIGS. 4 and 5.
Figure 4:
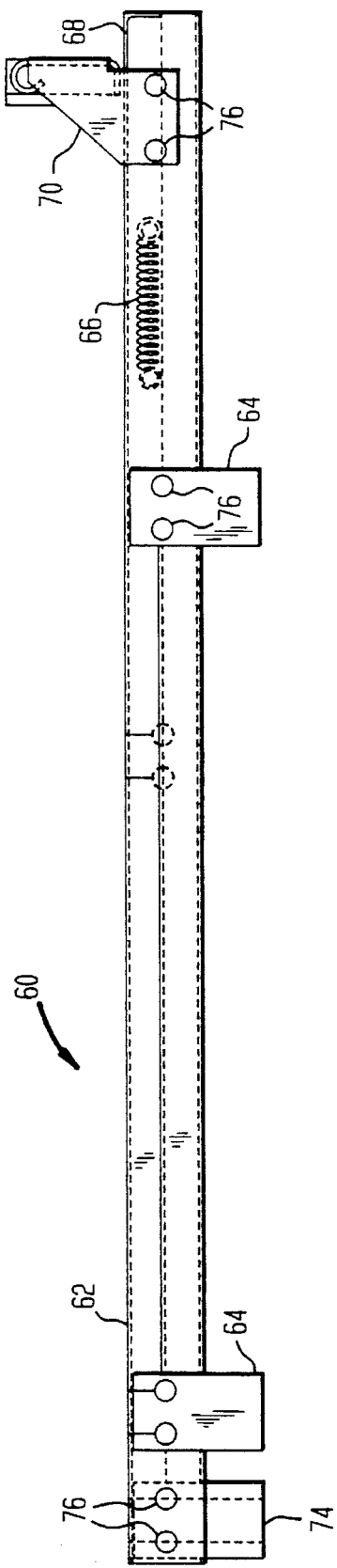
FIG. 4 is a plan view of an extractor.
Figure 5:
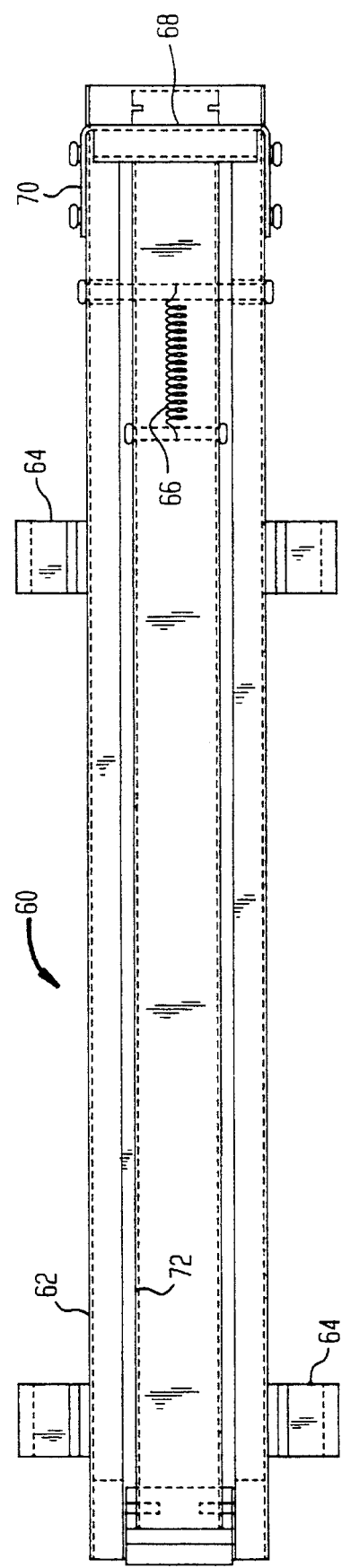
FIG. 5 is an elevation view of the extractor shown in FIG. 4.

FIGS. 4, 5 and 6 show plan, elevation and side views, respectively, of an extractor 60 according to the present invention. The extractor 60, which serves as an extension member to extend an operator's reach, is particularly useful in removing spent drill bit cassettes from the drill press and loading them into the device 8. The extractor can also be used, however, to extend an operator's reach while a new drill bit cassette is being inserted from the device 8 into the receptacle, particularly if the drill bit cassette is one of the last ones within the device 8.

The extractor 60 includes an elongate channel portion 62 that is dimensioned to mate with the device 8 as shown in FIG. 7. Two pairs of ears 64 are attached to the edges of and extend downward beyond the top surface of the channel portion 62. The ears 64 allow the extractor 60 to slide along and to rest on top of the device 8. A cassette receiving portion 74, which is notched to receive a drill bit cassette, is attached to one end of the channel portion 62 and to a linkage 72. The linkage 72 extends within and along the length of the channel member 62, connecting with one end of a spring 66. The other end of the spring 66 is connected to a release 68. The release 68 is disposed at other end of the channel portion 62 (i.e., opposite the cassette receiving portion 74) within reach of a handle 70. The handle 70 is attached to the channel portion 62 by screws 76. To actuate the release 68 and to operate the cassette receiving portion 74, the operator presses down on the release 68, which tenses the spring 66 and causes the linkage 72 to move rearward, thereby opening the cassette receiving portion 74.

During the removal of a spent cassette from the drill press as shown in FIG. 7, the operator positions the device 8 as described above so that the nose portion 16 engages the receptacle of the head. The operator then slides the extractor 60, which is positioned on top of the device 8, toward the spent cassette. The operator actuates the release 68 to open the cassette receiving portion 74 and engage the spent cassette. The spent cassette is retained within the cassette receiving portion 74 when the operator allows the release 68 to return to its normal position. The operator then removes the spent cassette from the receptacle and slides it into the channel member 10 of the device 8 by drawing the extractor 60 rearward. The spent cassette is released from the extractor 60 by actuating the release lever 68. To unload another spent cassette, the operator lifts the extractor 60 off of the device 8 and places it ahead of the spent cassette that is already loaded within the channel member 10 and repeats the procedure.

During the insertion of a new cassette, the extractor 60 can be used to extend an operator's reach in pushing the cassette into the receptacle of the head. In this case, operating the release 68 is not required because the new cassette can be pushed into position while the cassette receiving portion 74 is closed.

When desired, the operator can pivot the pivoting portion 24 of the retainer 20 to secure the cassettes within the channel member 20. In this way, the device 8 can be used to protect and permit easier handling of the cassettes while preventing exposed drill bits from injuring the operator.

Although the nose portion of the device described above is dimensioned to fit within a receptacle of the head of the drill press, the nose portion can also be dimensioned to fit over a corresponding portion of the drill press that projects outward.

The device of the present invention permits safe and efficient handling and storage of drill bit cassettes. In particular, the device allows smaller operators to transfer drill bit cassettes effectively. As a result, fewer drill bit cassettes are lost or damaged, and injury to operators is minimized.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A method of transferring at least one drill bit cassette between a drill press and a device for storing and handling said at least one drill bit cassette, said device including a channel member having a height, two ends and a length extending between said two ends, at least one of said two ends being dimensioned to slidingly receive said at least one drill bit cassette, the method comprising:

aligning one of said two ends of said channel member with a receptacle in a drill press;

engaging said one of said two ends with said receptacle; and transferring said at least one drill bit cassette between said drill press and said device by at least one of sliding said at least one drill bit cassette from said receptacle into said channel member and pushing said at least one cassette from said channel member into said receptacle.

2. A device for storing and handling at least one drill bit cassette, said device comprising a channel member having a height, two ends and a length extending between said two ends, wherein at least one of said two ends is dimensioned to slidingly receive said at least one drill bit cassette, wherein said channel member further comprises at least one nose portion that projects from one of said two ends, said at least one nose portion being engageable with a receiving portion of a drill press to align said device with said drill press for transferring said at least one drill bit cassette therebetween.

3. A device for storing and handling at least one drill bit cassette, said device comprising:

a channel member having a height, two ends and a length extending between said two ends, wherein at least one of said two ends is dimensioned to slidingly receive said at least one drill bit cassette, wherein at least one of said two ends includes a retainer that covers at least a portion of one end of said channel member and prevents removing and inserting said at least one drill bit cassette, said retainer being movable between an open position and a closed position.

4. A device for storing and handling at least one drill bit cassette, said device comprising a channel member having a height, two ends and a length extending between said two ends, wherein at least one of said two end is dimensioned to slidingly receive said at least one drill bit cassette; and further comprising a height compensation member attached to said channel member, said height compensation member having an extended position and a retracted position, wherein said height compensation member in said extended position extends said height of said channel member, and wherein said height compensation member in said retracted position does not project beyond said height of said channel member.

5. The device of claim 4, wherein said height compensation member is at least one roller that projects through a slot in said channel member and is normally biased to said extended position by a spring.

6. The device of claim 2, wherein said two ends of said channel member are symmetrical.

7. A device for storing and handling at least one drill bit cassette, said device comprising;

a channel member having a height, two ends and a length extending between said two ends, wherein at least one of said two ends is dimensioned to slidingly receive said at least one drill bit cassette, wherein said channel member includes an upper portion having slots disposed along and parallel to said length and extending between said two ends dimensioned to receive edges of said at least one drill bit cassette attached to a U-shaped lower portion having a depth greater than a height of a drill bit within said at least one drill bit cassette.

8. A device for storing, handling and transferring at least one drill bit cassette, said device comprising:

a channel member having a height, two ends and a length extending between said two ends, wherein at least one of said two ends is dimensioned to slidingly receive said at least one drill bit cassette; and an extending member that extends a reach of an operator, said extending member having a cassette engaging end dimensioned to engage said at least one drill bit cassette and an operating end disposed opposite said cassette engaging end, wherein actuating said operating end opens said engaging end to permit engaging said at least one drill bit cassette for transfer between said device and a drill press.

9. The device of claim 8, wherein said cassette engaging end includes a notched portion.

10. The device of claim 8, wherein said operating end includes a release connected by a linkage to said cassette engaging end.

11. The device of claim 10, wherein said linkage includes a spring, and wherein said cassette engaging end is normally biased to a closed position by said spring.

12. The device of claim 8, wherein said channel member further comprises at least one nose portion that projects from one of said two ends, said at least one nose portion being engageable with a receiving portion of said drill press to align said device with said drill press for transferring said at least one drill bit cassette therebetween.

13. The device of claim 8, wherein at least one of said two ends includes a retainer that prevents withdrawing and inserting said at least one drill bit cassette, said retainer being movable between an open position and a closed position.

14. The device of claim 8, further comprising a height compensation member attached to said channel member, said height compensation member having an extended position and a retracted position, wherein said height compensation member in said extended position extends said height of said channel member, and wherein said height compensation member in said retracted position does not project beyond said height of said channel member.

15. The device of claim 14, wherein said height compensation member is normally biased to said extended position by a spring.

16. The method of claim 1, wherein said device includes a height compensation member having an extended position and a retracted position, said height compensation member in said extended position extending said height of said channel member, and wherein said step of engaging includes depressing said device to retract said height compensation member to compensate for a height differential between a height of said receptacle above a work surface and said height of said channel member.

17. The method of claim 1, wherein said device includes an extending member, and wherein said step of transferring includes a step of contacting at least one drill bit cassette with said extending member.

18. The method of claim 17, wherein said extending member has an operating end and a cassette engaging end, and wherein said step of contacting includes:

actuating said operating end to engage said cassette engaging end to slide said at least one drill bit cassette from said receptacle; and pushing said at least one drill bit cassette into said receptacle with said cassette engaging end.

19. The method of claim 1, wherein channel member includes a nose portion dimensioned to engage said receptacle, and wherein said step of engaging includes pressing said nose portion into said receptacle.

\* \* \* \* \*